(12) United States Patent
Goslawski

(10) Patent No.: US 9,976,281 B2
(45) Date of Patent: May 22, 2018

(54) ECCENTRIC ASSEMBLY FOR WALKING MECHANISM

(71) Applicant: Caterpillar Global Mining LLC, Oak Creek, WI (US)

(72) Inventor: Erik A. Goslawski, Burlington, WI (US)

(73) Assignee: Caterpillar Global Mining LLC, Tucson, AZ (US)

( * ) Notice: Subject to any disclaimer, the term of this patent is extended or adjusted under 35 U.S.C. 154(b) by 156 days.

(21) Appl. No.: 15/046,579

(22) Filed: Feb. 18, 2016

(65) Prior Publication Data

US 2017/0241103 A1    Aug. 24, 2017

(51) Int. Cl.
*E02F 9/04* (2006.01)
*E02F 3/48* (2006.01)
*F16H 57/00* (2012.01)

(52) U.S. Cl.
CPC ........... *E02F 9/04* (2013.01); *F16H 57/0018* (2013.01); *E02F 3/48* (2013.01)

(58) Field of Classification Search
CPC .. E02F 9/04; E02F 9/045; F16H 55/32; F16H 57/0018; B62D 57/02; F16F 15/34; F16C 3/023; F16C 3/10; F16C 3/30
USPC ...................................... 180/8.1–8.7; 37/394
See application file for complete search history.

(56) References Cited

U.S. PATENT DOCUMENTS

| | | | |
|---|---|---|---|
| 1,054,883 A * | 3/1913 | Vale | F16F 15/34 74/570.1 |
| 3,265,145 A | 8/1966 | Beitzel | |
| 3,537,333 A * | 11/1970 | Just | F16C 3/10 29/888.08 |
| 3,901,341 A | 8/1975 | Stoldt | |
| 4,252,204 A | 2/1981 | Bishop | |
| 4,334,587 A | 6/1982 | Rangaswamy | |
| 5,237,892 A * | 8/1993 | Fry | F16C 3/06 29/888.08 |
| 5,245,882 A | 9/1993 | Kallenberger et al. | |
| 5,600,905 A * | 2/1997 | Kallenberger | B62D 57/00 180/8.1 |
| 5,603,174 A | 2/1997 | Kallenberger et al. | |

(Continued)

FOREIGN PATENT DOCUMENTS

CN          104670355          6/2015

*Primary Examiner* — Adam D Rogers
(74) *Attorney, Agent, or Firm* — Mattingly, Burke, Cohen & Biederman

(57) ABSTRACT

An eccentric assembly for a walking mechanism is provided. The eccentric assembly includes a barrel member and a shaft member. The barrel member includes a circumferential portion extending in a longitudinal direction and a web portion extending inwardly from the circumferential portion. Further, the web portion includes a cut-out region and an inner periphery outlining the cut-out region. The shaft member includes a tubular portion extending in the longitudinal direction and a flange portion extending outwardly from the tubular portion. The flange portion includes an outer periphery. Further, the shaft member is coupled to the barrel member such that the outer periphery of the flange portion substantially conforms to the inner periphery of the web portion. Further, the flange portion is configured to adjust an eccentricity of the shaft member with respect to the barrel member.

20 Claims, 7 Drawing Sheets

(56) References Cited

U.S. PATENT DOCUMENTS 6,067,734 A 5/2000 Kallenberger
9,027,438 B1 5/2015 Thomas et al.

* cited by examiner

ECCENTRIC ASSEMBLY FOR WALKING MECHANISM

TECHNICAL FIELD

The present disclosure relates to a walking mechanism of a work machine, and more particularly relates to an eccentric assembly for the walking mechanism.

BACKGROUND

Walking mechanisms are conventionally used in heavy equipment, specifically dragline excavators, for their movement. The dragline excavators, generally, include a circular, disc-like driving member rotatably disposed within a cylindrical bushing, which is connected to the walking arm assembly. The walking mechanism includes a link member to couple to the circular disc with a walking shoe of the walking assembly. The walking assembly transforms the rotational motion of the circular disc, via the link member, to a translation motion of the walking shoes.

U.S. Pat. No. 9,027,438 ('438 reference) discloses an eccentric assembly used in walking mechanism sub-assemblies of heavy equipment, specifically drag line excavators. The walking assemblies include a power driven output shaft which engages and rotates an eccentric fitting. The output shaft is journaled within a leg housing which is in turn pivotally secured to the walking mechanism shoes. Further, the output shaft is secured through a support linkage to the excavator frame imparting a modified elliptical travel path thereto. The eccentric disclosed in '438 reference is fabricated from multiple components. However the said reference does not provide any means for modularity of the fabricated eccentric assembly. Also, the reference suggests that the completed eccentric assembly is not fully fabricated of forged components.

SUMMARY OF THE DISCLOSURE

In one aspect of the present disclosure, an eccentric assembly for a walking mechanism is provided. The eccentric assembly includes a barrel member. The barrel member includes a circumferential portion extending in a longitudinal direction. The barrel member also includes a web portion extending inwardly from the circumferential portion and substantially perpendicular to the longitudinal direction. The web portion includes a cut-out region and an inner periphery outlining the cut-out region. The shaft member includes a tubular portion extending in the longitudinal direction. The shaft member also includes a flange portion extending outwardly from the tubular portion and substantially perpendicular to the longitudinal direction. The flange portion includes an outer periphery. Further, the shaft member is coupled to the barrel member such that the outer periphery of the flange portion substantially conforms to the inner periphery of the web portion. Further, the flange portion is configured to adjust an eccentricity of the shaft member with respect to the barrel member.

In another aspect of the present disclosure, a barrel member of an eccentric assembly is provided. The barrel member includes a circumferential portion extending in a longitudinal direction. The barrel member also includes a web portion extending inwardly from the circumferential portion and substantially perpendicular to the longitudinal direction, the web portion comprising a cut-out region and an inner periphery outlining the cut-out region.

In yet another aspect of the present disclosure a shaft member of an eccentric assembly is provided. The shaft member includes a tubular portion extending in a longitudinal direction. The shaft member also includes a flange portion extending outwardly from the tubular portion and substantially perpendicular to the longitudinal direction. The flange portion includes an outer periphery. Further, the flange portion is alterable to adjust an eccentricity of the shaft member in the eccentric assembly.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
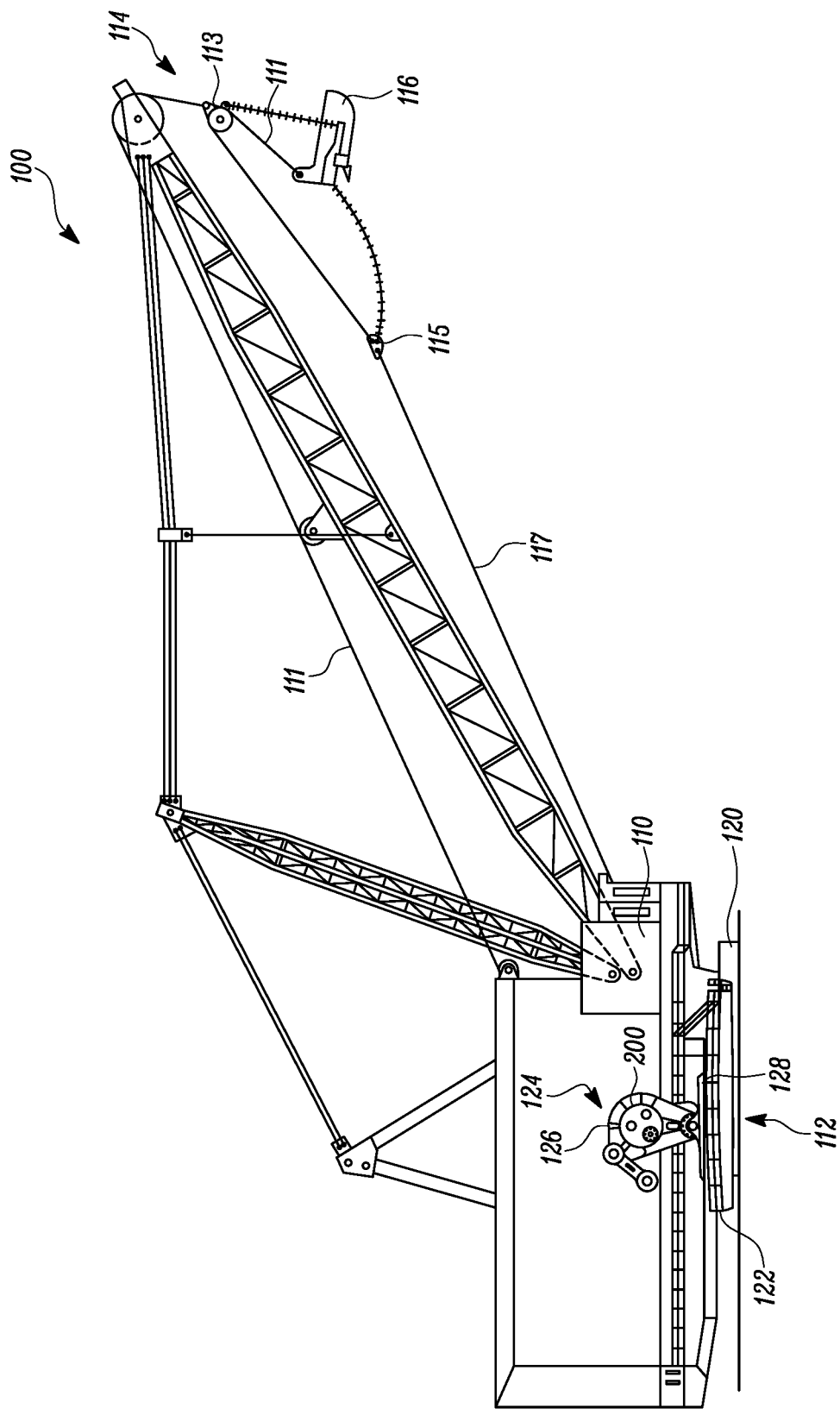
FIG. 1 is a planar view of a work machine equipped with an walking mechanism, according to an embodiment of the present disclosure.

FIG. 1 illustrates a side view of an exemplary work machine 100, according to an embodiment of the present disclosure. The work machine 100 may be an excavator, a drill, a rope shovel, or any earth-working machine that works on plain surfaces. In the illustrated embodiment, the work machine 100 is shown to be a dragline excavator-type earthmoving machine.

The dragline excavator 100 includes a main frame 110, a walking mechanism 112 and a bucket rigging assembly 114. The bucket rigging assembly 114 includes one or more hoist ropes 111, a hoist coupler 113, a dragline bucket 116, a drag socket 115 and one or more dragline ropes 117. The hoist ropes 111 are coupled to the dragline bucket 116 by the hoist coupler 113 and are configured to employ the dragline bucket 116 at the worksite. Further, the dragline bucket 116 is coupled to the dragline rope 117 by the drag socket 115 and is configured to pull the dragline bucket 116 towards the main frame 110.

The walking mechanism 112 is configured to propel the dragline excavator 100. The dragline excavator 100 includes a power source (not shown) to power various parts of the dragline bucket 116, the walking mechanism 112 and the like. In one example, the power source may include an electric drive assembly having an electric motor (not shown) that transfers power to the walking mechanism 112 through a gearbox transmission (not shown). In other example, the power source may include an engine, such as a diesel engine, a gasoline engine, a gaseous fuel-powered engine, or any other type of combustion engine known in the art.

Figure 2:
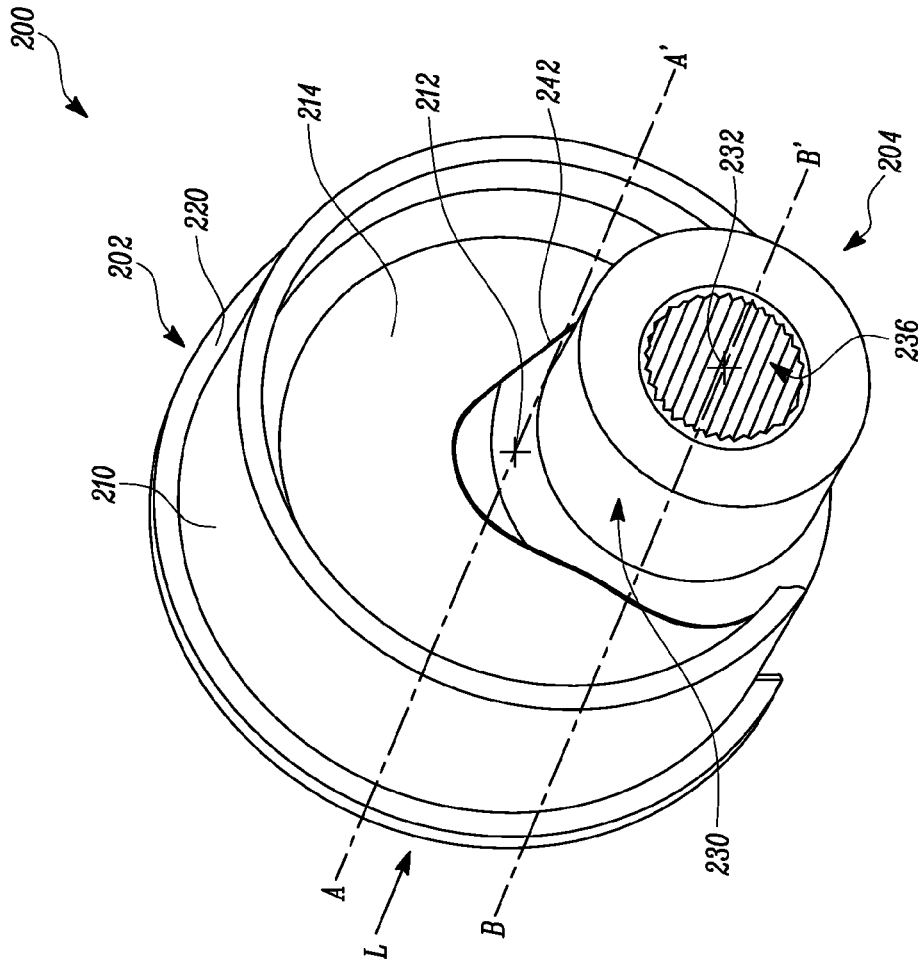
FIG. 2 is a perspective view of an eccentric assembly for the walking mechanism, according to an embodiment of the present disclosure.
Figure 3:
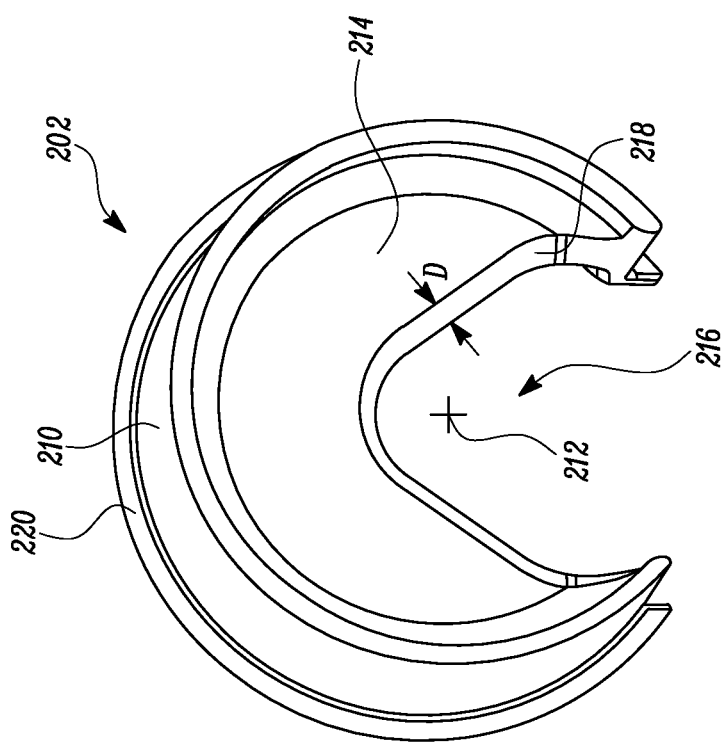
FIG. 3 is a perspective view of a barrel member of the eccentric assembly, according to an embodiment of the present disclosure.

The walking mechanism 112 may include, but not limited to, tracks, wheels or any combination thereof, for propelling the dragline excavator 100. The walking mechanism 112 of the present disclosure embodies a walking mechanism for the dragline excavator 100, and hereinafter referred to as a walking mechanism 112. It may be contemplated that the walking mechanism 112 of the present disclosure may be equally useful for other types of machines. The walking mechanism 112, as diagrammatically illustrated in FIG. 1, includes, in general, a dragline base 120 mounted on the main frame 110. As illustrated, the dragline base 120 supports the main frame 110. A pair of identical walking shoes 122, only one of which may be seen, may be disposed along opposite sides of the dragline base 120 and are connected to the dragline base 120. A circular member 200 (as shown in FIG. 2) is coupled to the walking shoes 122 by means of a walking arm 124. The walking arm 124 includes a first end 126 coupled to the circular member 200. The first end 126 is eccentrically coupled to the eccentric assembly 200. The walking arm 124 includes a second end 128 coupled to the walking shoes 122. The circular member 200 of the present disclosure provides an eccentric assembly, hereinafter referred as an eccentric assembly 200.

Referring to FIGS. 2-5, the eccentric assembly 200 is illustrated, in accordance with an embodiment of the present disclosure. The eccentric assembly 200 includes a barrel member 202 and a shaft member 204. In the present embodiment, the barrel member 202 and the shaft member 204 are made of steel. Alternately, the barrel member 202 and the shaft member 204 may be made of any other metal or alloy known in the art. The barrel member 202 is configured to couple to the walking arm 124. The barrel member 202 is an annular shaped member that includes a circumferential portion 210. The circumferential portion 210 extends along a longitudinal direction 'L'. The barrel member 202 further defines an axis A-A' along the longitudinal direction 1' as shown in FIG. 2. The axis A-A' passes through a geometric center 212. The barrel member 202 includes a web portion 214. The web portion 214 extends inwardly from the circumferential portion 210. The web portion 214 is substantially perpendicular to the longitudinal direction 'L'. The thickness of the web portion 214 may vary according to the load bearing capacity of the walking mechanism 112.

The web portion 214 defines a cut-out region 216. The cut-out region 216 is configured to receive another member that will be discussed further in the disclosure. In an example, the cut-out region 216 is substantially 'V' shaped. In another example, the cut-out region 216 may be of any other shape such as circular, square and the like. The web portion 214 includes an inner periphery 218. The inner periphery 218 outlines the cut-out region 216. A depth 'D' of the inner periphery 218 is equivalent to the corresponding thickness of the cut-out region 216.

The eccentric assembly 200 also includes a flange portion 220. The flange portion 220 extends outwardly on the circumferential portion 210 of the barrel member 202. Further, the flange portion 220 is substantially perpendicular to the axis A-A' in the longitudinal direction 'L'. The flange portion 220 is configured to couple with the walking mechanism 112. In the present embodiment, the flange portion 220 is fixedly coupled to the circumferential portion 210 by welding. In an alternate embodiment, the flange portion 220 may be casted with or forged on the circumferential portion 210 or by using any other means of fixedly coupling two components known in the art. In the present embodiment, the barrel member 202 is manufactured by forging process. Further, the cut-out region 216 is formed in the barrel member 202 during the forging process. Alternately, the barrel member 202 and the cut-out region 216 may be manufactured by techniques like extrusion, or any other technique involving application of external force.

Figure 4:
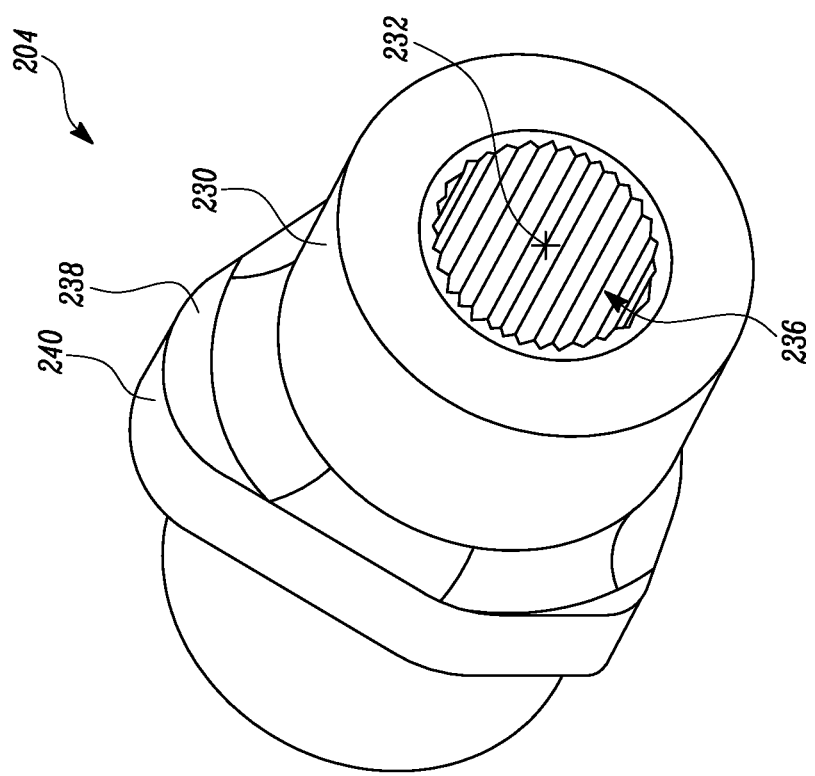
FIG. 4 is a perspective view of a shaft member of the eccentric assembly, according to an embodiment of the present disclosure.
Figure 5:
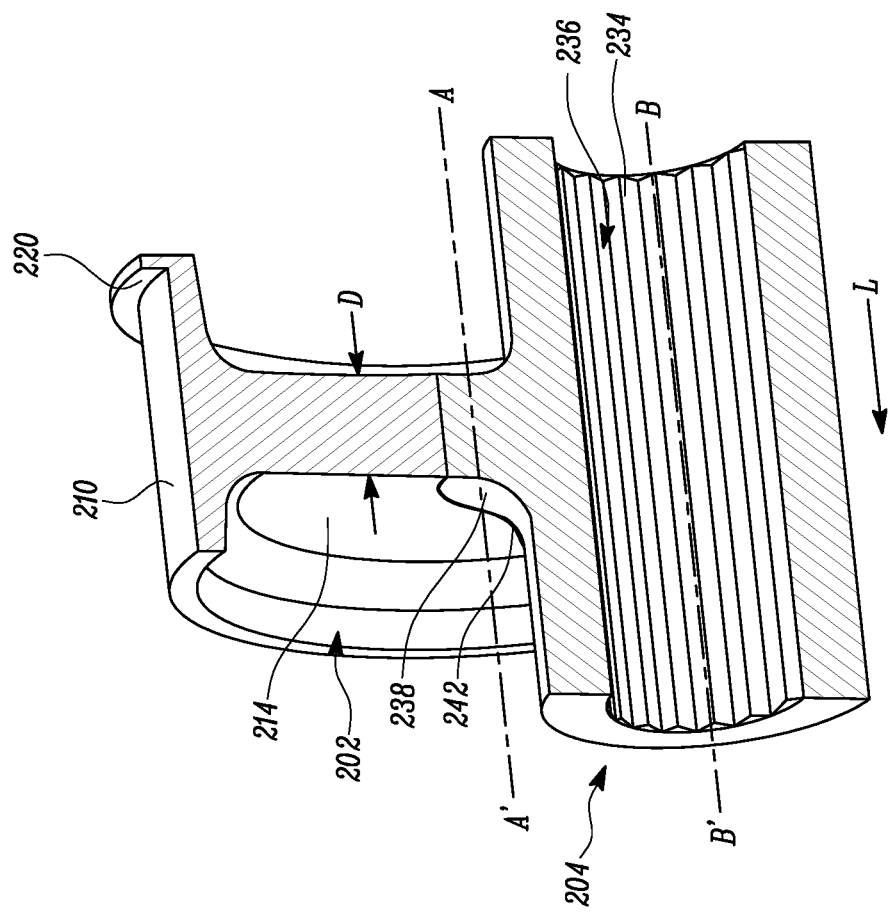
FIG. 5 is a cross sectional view of the eccentric assembly, according to an embodiment of the present disclosure.

Referring to FIG. 4, the shaft member 204, of the eccentric assembly 200, includes a tubular portion 230 that extends along the longitudinal direction L'. The tubular portion 230 includes a geometric center 232. The geometric center 232 defines an axis B-B' that is parallel to the axis A-A'. The tubular portion 230 includes an interior portion 234. The interior portion 234 includes a plurality of splines 236. The plurality of splines 236 are configured to mate with the walking mechanism 112. In the present embodiment the plurality of splines 236 extend along the interior portion 234. In an alternate embodiment, the plurality of splines 236 may not extend continuous to the interior portion 234. The shaft member 204 includes a flange portion 238 that is integral to the tubular portion 230 such that the flange portion 238 extends outwardly from the tubular portion 230. The flange portion 238 extends substantially perpendicular to the axis B-B' along the longitudinal direction 'L'. The flange portion 238 includes an outer periphery 240. The flange portion 238 is configured to adjust a shaft eccentricity denoted by 'X' (as shown in FIGS. 6 and 7) of the shaft member 204 with respect to the barrel member 202.

In the present embodiment, the shaft member 204 is manufactured by forging process. Alternately, the shaft member 204 may be manufactured by techniques, such as extrusion or any other technique involving application of external force. The eccentric assembly 200 includes the barrel member 202 fixedly coupled to the shaft member 204, such that the inner periphery 218 of the web portion 214 substantially conforms to the outer periphery 240 of the flange portion 238. In the present embodiment, the eccentric assembly 200 includes a weld joint 242 between the inner periphery 218 of the web portion 214 and the outer periphery 240 of the flange portion 238. In an alternate embodiment, the inner periphery 218 and the outer periphery 240 may be coupled by press-fit technique, riveting or any other method known in the art.

Figure 6:
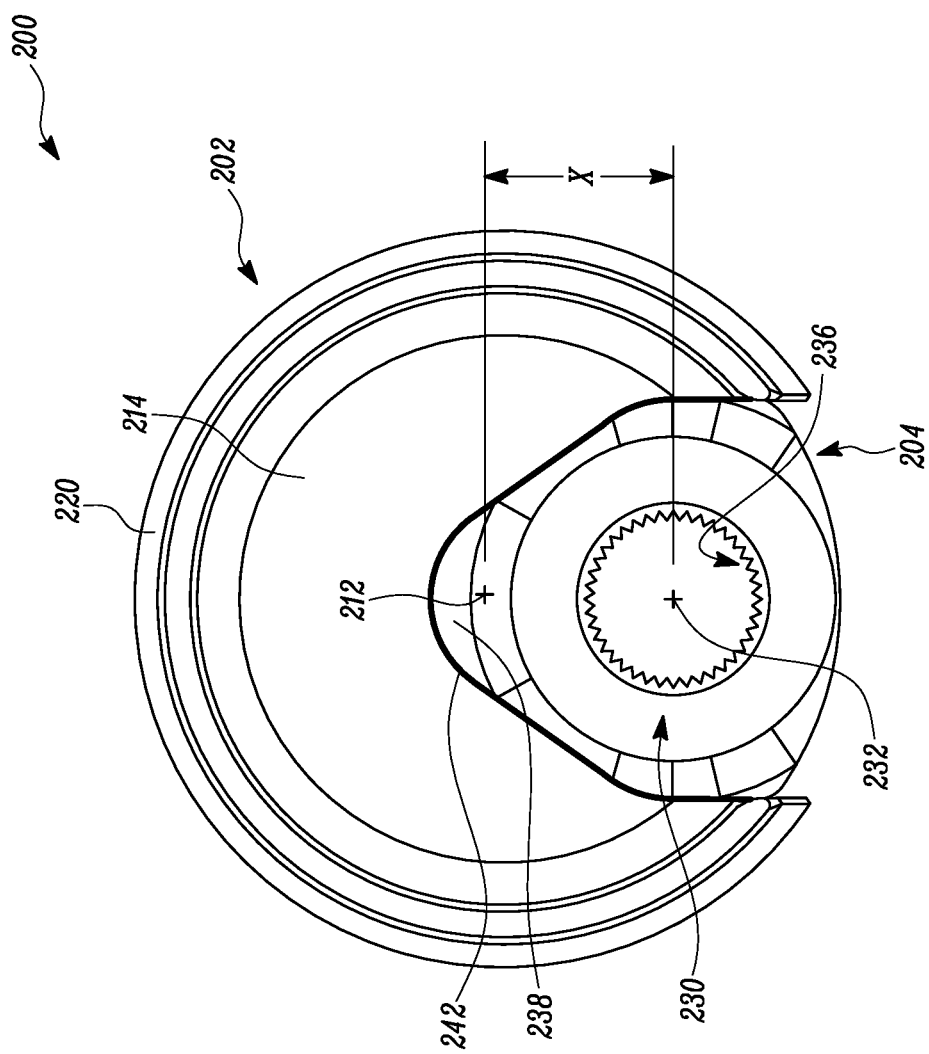
FIG. 6 is a planar view of the eccentric assembly, according to a first embodiment of the present disclosure.
Figure 7:
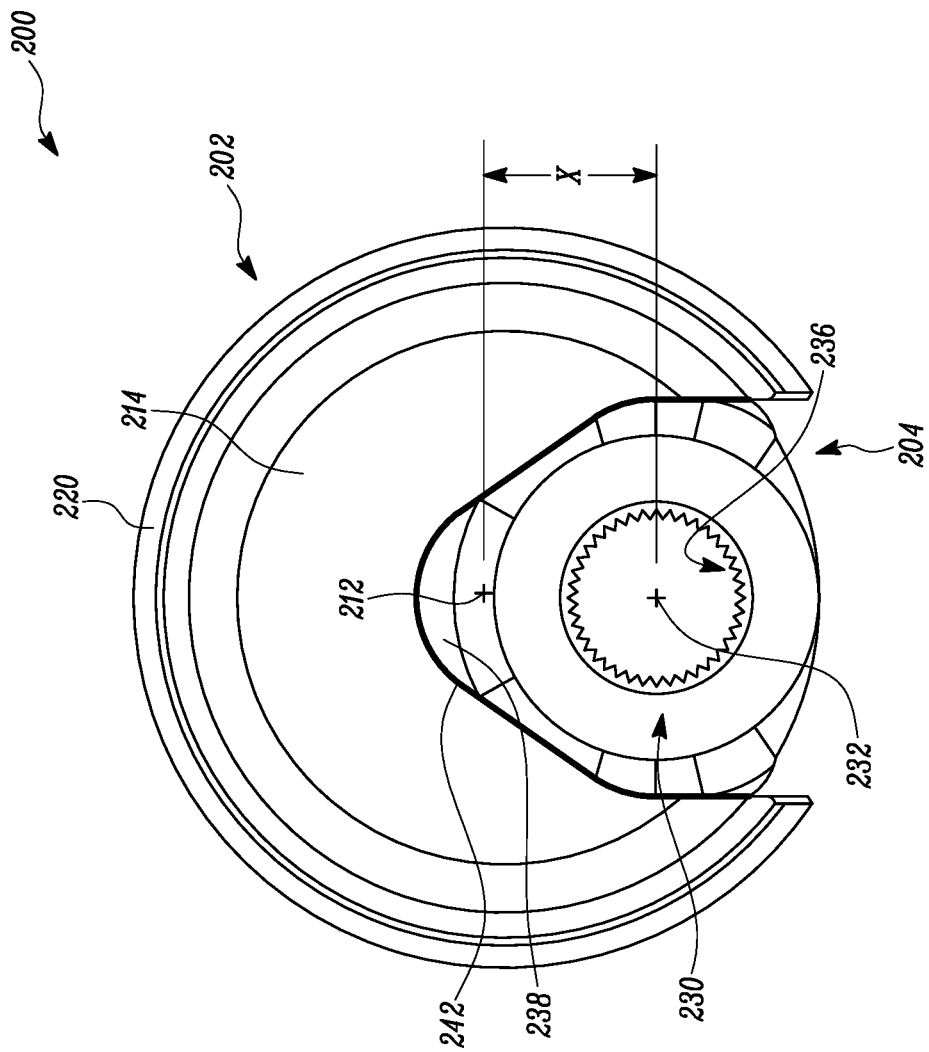
FIG. 7 is a planar view of the eccentric assembly, according to a second embodiment of the present disclosure.

FIGS. 6-7 show planar views of the eccentric assembly 200. The barrel member 202 is fixedly coupled to the shaft member 204 by the weld joint 242 between the inner and outer periphery 218, 240. The distance between the geometric center 212 of the barrel member 202 and the geometric center 232 of the shaft member 204 corresponds to the shaft eccentricity 'X'. In an embodiment, 'the flange portion 238 is machined to alter the outer periphery 240, thereby adjusting the shaft eccentricity 'X' of the shaft member 204 with respect to the barrel member 202 when the flange portion 238, with the altered outer periphery 240, is coupled to the web portion 214.

INDUSTRIAL APPLICABILITY

The present disclosure relates to the eccentric assembly 200 for a walking mechanism 112. The walking mechanism 112 includes the eccentric assembly 200 configured to provide a walking motion to the dragline excavator 100. The eccentric assembly 200 includes the barrel member 202 that is forged from a single billet of steel, where the shape of the barrel member 202 replicates geometry of the cast. Also, the shaft member 204 is forged from a single billet of steel. The flange portion 238 enables a unique 'key' shape to mate with a key cut in the barrel member 202, and also pushes the weld (heat affected zone) away from critical stress area of the web portion 214 and the flange portion 238.

The flange portion 238 may be machined to adapt to the necessary shaft eccentricity 'X' required by the walking mechanism 112 of the machine 100. In an example, the shaft eccentricity 'X' may be 26 inches in length for a dragline excavator 100. In some cases, the customer may require a lower shaft eccentricity 'X', for example, 21 inches. The present disclosure allows machining of the outer periphery 240 of the flange portion 238 to meet customer requirements. Further, the customization of the shaft eccentricity 'X' reduces the machining time to achieve eccentricity variance. The flange portion 238 incorporates a large radius to reduce the stress concentration during the walking of the dragline excavator 100.

The eccentric assembly 200 allows both semi-finished parts to be stocked, which can be adjusted to suit customer requirements and variations of the finished eccentric assembly 200. The flexibility to make adjustments in the shaft eccentricity 'X' reduces the lead-time for assembling the customized finished component. Further, making the barrel and shaft members 202, 204 using the forging process eliminates casting defects and improves material properties.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An eccentric assembly for a walking mechanism, the eccentric assembly comprising:
    a barrel member comprising:
        a circumferential portion extending in a longitudinal direction; and
        a web portion extending inwardly from the circumferential portion and substantially perpendicular to the longitudinal direction, the web portion comprising a cut-out region and an inner periphery outlining the cut-out region;
        the cut-out region including a closed end, and an open end, and the inner periphery having a first inner side and a second inner side oriented diagonally to one another so as to form an angle that opens toward the open end;
        the inner periphery further including a third inner side extending between the open end of the cut-out region and the first inner side, and a fourth inner side extending between the open end of the cut-out region and the second inner side, and the third inner side and the fourth inner side oriented substantially parallel to one another; and
    a shaft member comprising:
        a tubular portion extending in the longitudinal direction; and
        a flange portion extending outwardly from the tubular portion and substantially perpendicular to the longitudinal direction, the flange portion comprising an outer periphery;
    wherein the shaft member is coupled to the barrel member such that the outer periphery of the flange portion substantially conforms to the inner periphery of the web portion; and
    wherein the flange portion is configured to adjust an eccentricity of the shaft member with respect to the barrel member.

2. The eccentric assembly of claim 1, wherein the flange portion is machined to alter the outer periphery, and thereby adjust the eccentricity of the shaft member with respect to the barrel member when the flange portion, with altered outer periphery, is coupled to the barrel member.

3. The eccentric assembly of claim 1 further comprising a weld joint between the inner periphery of the web portion and the outer periphery of the flange portion.

4. The eccentric assembly of claim 1, wherein the first inner side and the second inner side of the inner periphery of the web portion form a 'V' shape.

5. The eccentric assembly of claim 1, wherein the flange portion is integral to the tubular portion.

6. The eccentric assembly of claim 1 further comprising a flange portion extending outwardly of the circumferential portion of the barrel member and substantially perpendicular to the longitudinal direction, wherein the flange portion is configured to mate with the walking mechanism.

7. The eccentric assembly of claim 1, wherein the barrel member is formed by a forging process.

8. The eccentric assembly of claim 7, wherein the cut-out region is formed in the barrel member during the forging process.

9. The eccentric assembly of claim 5, wherein the flange portion is welded to the circumferential portion of the barrel member.

10. The eccentric assembly of claim 1, wherein the shaft member is formed by a forging process.

11. The eccentric assembly of claim 1 further comprising a plurality of splines defined in an interior surface of the tubular portion of the shaft member, wherein the plurality of splines is configured to mate with the walking mechanism.

12. The eccentric assembly of claim 1, wherein the barrel member and the shaft member are made of steel.

13. A barrel member of an eccentric assembly, the barrel member comprising:
    a circumferential portion extending in a longitudinal direction; and
    a web portion extending inwardly from the circumferential portion and substantially perpendicular to the longitudinal direction, the web portion comprising a cut-out region and an inner periphery outlining the cut-out region;
    the cut-out region including a closed end, and an open end, and the inner periphery having a first inner side and a second inner side oriented diagonally to one another so as to form an angle that opens toward the open end; and
    the inner periphery further including a third inner side extending between the open end of the cut-out region and the first inner side, and a fourth inner side extending between the open end of the cut-out region and the second inner side, and the third inner side and the fourth inner side oriented substantially parallel to one another.

14. The barrel member of claim 13, wherein the first inner side and the second inner side of the inner periphery of the web portion form a 'V' shape.

15. The barrel member of claim 13 is formed by a forging process.

16. The barrel member of claim 15, wherein the cut-out region in the web portion is formed during the forging process.

17. A shaft member of an eccentric assembly, the shaft member comprising:
   a tubular portion extending in a longitudinal direction; and
   a flange portion extending outwardly from the tubular portion and substantially perpendicular to the longitudinal direction, the flange portion comprising an outer periphery, wherein the flange portion is alterable to adjust an eccentricity of the shaft member in the eccentric assembly;
   the outer periphery including a first outer side and a second outer side oriented diagonally to one another; and
   the outer periphery further including a third outer side adjacent to the first outer side, and a fourth outer side adjacent to the second outer side, and the third outer side and the fourth outer side oriented substantially parallel to one another.

18. The shaft member of claim 17, wherein the outer periphery of the flange portion is alterable to adjust the eccentricity of the shaft member in the eccentric assembly.

19. The shaft member of claim 17, wherein the flange portion is integrally formed with the tubular portion by a forging process.

20. The shaft member of claim 17, wherein the first outer side and the second outer side of the outer periphery, defined by the flange portion, form a 'V' shape.

* * * * *